Patented May 10, 1932

1,857,698

UNITED STATES PATENT OFFICE

JOHANNES SCHEIBER, KURT SÄNDIG, OF LEIPZIG, AND ALEXIS BLUMER, OF ZWICKAU, GERMANY

PROCESS OF TREATING BATAVIAN DAMMAR RESIN

No Drawing.   Application filed March 6, 1928.   Serial No. 259,596.

The present invention relates to a process for the treatment of Batavian dammar resin.

The fact that Batavian dammar resin is only partially soluble in the solvents used in the manufacture of cellulose ester varnishes is a great disadvantage when using natural dammar resin for this purpose. The cellulose ester varnishes become very turbid, necessitating objectionable filtering and clarifying processes which always results in loss of a considerable amount of the substance. Further, even a varnish clarified in this manner will still tend occasionally to form a turbid film on being applied.

This behaviour of the dammar resin is to be attributed to its composition. Dammar resin is known to consist of several constituents, in which dammarolic acid (23%) and two inert products distinguished as α- and β-dammar-resenes (40% and 22.5%) predominate. Whereas dammarolic acid and the α-dammar-resene are easily soluble in benzene-alcohol mixtures, β-dammar-resene is insoluble in alcohol. Other alcohols, esters, ketones etc. i. e. the particular solvents used for cellulose esters, behave similarly to alcohol.

In order to overcome this objection to the use of dammar resin in cellulose ester varnishes, it has been proposed to add to the solution of the natural dammar in toluene, before admixture with the cellulose ester solution, a sufficient quantity of alcohol or similarly acting solvent (acetone, ethyl acetate, etc.) say 30 to 40% referred to the hydro-carbon, to precipitate the β-resene. The clear solution of the remaining constituents of the dammar resin obtained after allowing to settle, can then be mixed with the cellulose ester varnish without any danger of causing turbidity.

This method achieves its object, but is, however, very objectionable and also uneconomical as the preparation of the β-resene, which is present in too great quantity to be neglected, for other technical purposes in connection with varnish is for various reasons too expensive to be a paying proposition, notwithstanding the particularly valuable properties possessed by the precipitated product, which is distinguished by its inertness. A further great disadvantage is that considerably diluted solutions of dammar resin have to be used and considerable loss of solvent is unavoidable in the various working operations. As regards particularly the precipitated β-resene, this separates out in a form retaining more or less large quantities of the solvent. β-resene thus swollen obviously causes considerable difficulties in the clarification by settling, or like methods.

It has now been discovered that the existing difficulties can be simply overcome, and special advantages obtained at the same time by means of a new process which consists in treating the dammar resin with suitable solvents or mixtures of solvents, thus dispensing with a precipitation process. The process can be used in various ways.

It has been found particularly advantageous to allow the vapours of suitable solvents or mixtures of solvents to act on dammar resin. The vapours must of course have a homogeneous composition, and consequently, only mixtures of solvents can be considered which form a constant boiling mixture. Mixtures of alcohols with aromatic hydro-carbons have been found particularly suitable, especially as such mixtures also, are capable of forming constant boiling mixtures with water also, a certain amount of which is always present. The compositions and boiling points of several such binary or ternary constant boiling mixtures are as follows:—

Benzene-alcohol         B.P. 68, 25° C: 32, 36% ethyl-alcohol.
Toluene-alcohol         B.P. 76,  5° C. 62    % ethyl-alcohol.
Benzene-alcohol-water   B.P. 64, 85° C: 18,  5% ethyl-alcohol.
Toluene-alcohol-water   B.P. 75,  1° C. 46    % ethyl-alcohol.

If the vapour of these mixtures is allowed to act on the resin, resting in a perforated container in the vapour chamber in a distilling apparatus of the usual type, only dammarolic acid and α-resene are extracted, whilst impurities and β-resene are left, and the latter can be easily kept absolutely dry.

Instead of the benzene-toluene-alcohol constant boiling mixtures indicated as preferable, other suitable mixtures can be used such as, benzene-alcohol or carbon bisulphide-alcohol mixtures. The only point which must always be observed is that it is necessary to use a mixture characterized by a constant boiling point i. e. a vapour of homogeneous composition. Further, one component of the vapour must have a solvent action on dammarolic acid and α-resene, whilst it is preferable for the β-resene to be insoluble in the other component which assumes a definite minimum concentration for this component of the vapour. Thus, for example, when using benzene alcohol mixtures in the presence of large quantities of water, it may be necessary owing to the relatively low alcohol concentration of the vapour (down to about 18,5%) to replace part of the benzene by toluene, in order to improve the action, the ternary mixture with alcohol and water containing, as is well known, 46% of ethyl alcohol. Other binary and ternary mixtures and mixtures of a higher order, also behave similarly to the mixtures considered.

The dammar resin can also be improved or purified by direct solution. In this connection, the surprising observation was made that particularly good results can be obtained by using suitable solvents or solvent mixtures. It is essential to use liquids or mixtures of liquid which dissolve dammarolic acid and α-dammar resene, but which have an action tending to reduce the swelling of the undissolved β-resene, which is always more or less swollen.

When using homogeneous solvents, amongst which are included alcohols, esters, ketones etc. the α-dammar-resene and dammarolic acid only are dissolved to a more or less great extent, whereas the β-resene remains absoutely unswollen and in a condition capable of easy filtration and further treatment. The contamination of the β-resene by the other constituents of the dammar not completely removed, has no effect for most purposes for which the substance is used.

In order to obtain as quantitative solution of dammarolic acid and α-dammar resene as possible, it has been found advisable, inter alia, to allow the solvent used to act at raised temperatures. Further, it has been found that this object can also be promoted by maintaining certain proportions between the dammar to be treated and the amount of solvent used. The most favourable ratio in any case can easily be determined by experiment. It is possible, by using solvents of the above type having different actions and also by combining the same, and further by maintaining different temperatures, to obtain purified dammar having slightly varying solubility properties such as are necessary for different cellulose ester varnishes.

The valuable property of the solvents mentioned, such as alcohols, ketones, esters, etc. namely of not having a swelling effect on the undissolved β-resene, is also preserved to a high degree when certain not too large quantities of liquids having a solvent action on β-resene are added to such liquids. Aromatic hydrocarbons, petroleum hydrocarbons, chlorinated hydrocarbons, carbon bisulphide and the like, may be particularly mentioned as examples of such liquids. This behaviour, which is of extreme importance for the production of purified dammar resin, could not in any way be anticipated. It is well known that resins, particularly resin acids (dammarolic acid in the case of dammar resin) have a dispersive power for similar products. Mention need only be made in this respect of the variations in the solubility of phenol-formaldehyde resins (determination of solubility in benzene etc.), caused by addition of colophony (abietic acid). In view of the above phenomena, it was extraordinarily surprising that the β-resene could be separted in an absolutely unswollen condition i. e. solid, hard and practically free from solvent and constituents of the varnish, by using such liquid mixtures, even when they were used in the heat and with high concentration of the resin.

*Example 1*

The vapour formed by heating a mixture of 33 kilograms of alcohol and 68 kilograms of benzene, or, in the presence of water, of 30 kilograms of alcohol, 50 kilograms of benzene and 15 kilograms of toluene is allowed to act on 100 kilograms of Batavian dammar resin which is placed in a perforated vessel covered with a filter cloth inside the vapour chamber of a distillation apparatus of the usual type. The vapours will have dissolved out the dammarolic acid and α-resene after a very short time, these two constituents being found in the bottom of the apparatus after the extraction, as a concentrated solution. The solution thus formed can be subjected directly to further treatment. A solid purified resin product can also be obtained, however, by distilling off the solvent. The mixture of β-resene and impurities, absolutely free from solvent, remaining on the filter cloth, is collected and subjected to separate extraction or further treated in known manner.

*Example 2*

One hundred kilograms of Batavian dammar are treated with 90 kilograms of ethyl acetate at raised temperature. A portion of the dammar goes into solution. On evaporation, a clear-coloured resin is formed which is particularly suitable for the manufacture of cellulose ester varnished. The solution first obtained is of course also suitable for direct use.

*Example 3*

One hundred kilograms of Batavian dammar are mixed with a mixture of 20 kilograms of benzene and 40 kilograms of spirit, and heated to the boiling point of the mixture for a short time. On cooling the β-resene separates out at the bottom along with the impurities present in the resin as a solid hard mass. The supernatant varnish can be used direct. The solvent can also be removed if necessary, and a purified resin product is thus obtained. The improved dammar resins also possess the desired property of being capable of convenient and easy admixture in solution with cellulose ester varnishes.

We declare that what we claim is:

1. The process of treating Batavian dammar resin which consists in exposing the resin to heated vapours of a constant boiling mixture of a plurality of solvents in which β-dammar-resene is substantially insoluble.

2. Process of treating Batavian dammar resin which consists in exposing it to the heated vapour of a constant boiling mixture of an aromatic hydrocarbon and an aliphatic alcohol.

In testimony whereof we affixed our signatures.

JOHANNES SCHEIBER.
KURT SÄNDIG.
ALEXIS BLUMER.